(12) United States Patent
Mortara et al.

(10) Patent No.: US 6,528,783 B1
(45) Date of Patent: Mar. 4, 2003

(54) POSITION SENSOR AND CIRCUIT FOR OPTICAL ENCODER

(75) Inventors: Alessandro Mortara, Lausanne (CH);
Peter Masa, Les Hauts Geneveys (CH);
Pascal Heim, Bevaix (CH); Friedrich Heitger, Bern (CH)

(73) Assignee: Bishop Innovation Limited, North Ryde (AU)

( * ) Notice: Subject to any disclaimer, the term of this patent is extended or adjusted under 35 U.S.C. 154(b) by 0 days.

(21) Appl. No.: 09/857,175

(22) PCT Filed: Nov. 17, 1999

(86) PCT No.: PCT/AU99/01013

§ 371 (c)(1),
(2), (4) Date: Sep. 7, 2001

(87) PCT Pub. No.: WO00/36377

PCT Pub. Date: Jun. 22, 2000

(30) Foreign Application Priority Data

Dec. 17, 1998 (AU) .............................. PP7778

(51) Int. Cl.[7] .............................. G01D 5/34
(52) U.S. Cl. .............................. 250/231.13; 250/231.14; 250/231.16; 250/208.1; 356/616; 356/617; 356/619; 341/9; 341/11; 341/13
(58) Field of Search .............................. 356/616, 617, 356/619; 250/231.13–231.18, 208.1, 237 R, 237 G; 341/9, 11, 13

(56) References Cited

U.S. PATENT DOCUMENTS 4,486,845 A    12/1984   Duckworth ................. 364/559

FOREIGN PATENT DOCUMENTS

WO          95/09349         4/1995

Primary Examiner—Que T. Le
Assistant Examiner—Christopher W. Glass
(74) Attorney, Agent, or Firm—Arent Fox Kintner Plotkin & Kahn PLLC

(57) ABSTRACT

An electronic circuit for measuring the position of a spatially periodic intensity pattern of incident radiation includes an array of detectors (1); two or more correlator units (2, 3) each having arrays of capacitors (12, 13) connected to a buffer (14); and a phase angle computing unit (4). The pitch of the array of detectors (1) is smaller than the pitch of the incident intensity pattern so that the latter is oversampled, yielding high accuracy. The detector outputs (17) are weighted by respective fixed capacitance values (15, 16) which vary periodically along arrays of capacitors (12, 13), and a weighted sum of outputs for each correlator unit (2, 3) is output at its respective buffer (14). The capacitance values (15, 16) of respective correlator units (2, 3) are mutually offset by a predetermined phase shift. The analog computation using capacitor arrays (12, 13) is fast and energy efficient, and can be implemented as a VLSI circuit.

12 Claims, 4 Drawing Sheets

POSITION SENSOR AND CIRCUIT FOR OPTICAL ENCODER

TECHNICAL FIELD

This invention relates to electronic circuits, and in particular to opto-electronic circuits forming part of the sensor component in linear or rotary encoders for the measurement of linear or angular displacement respectively.

BACKGROUND

Typically in such encoders, one or more fixed sources of electromagnetic radiation (EMR) are arranged to illuminate a graduated planar or cylindrical surface. The markings on the graduated surface comprise regions of high and low reflectivity (or, alternatively, high and low transmissibility) to the EMR and the reflected (or transmitted) component of the EMR is arranged to impinge on a fixed opto-electronic sensor which detects the time-dependent or spatially distributed intensity pattern of the incident EMR, and hence provide measurement of the relative position of the graduated surface. Both such "reflective" and "transmissive" encoder versions are used commonly in industry and consumer products today for measurement of linear or angular displacement, although the latter arrangement is more common.

The opto-electronic sensor incorporated in such encoders typically employ four photodiodes and a "quadrature interpolation" method, well known in the art, is used to increase the positional measurement resolution well above the pitch of markings on the respective graduated planar or cylindrical surface of the encoder. In U.S. Pat. No. 4,410,798 (Breslow) and U.S. Pat. No. 5,235,181 (Durana et al.) various implementations are described where the measurement resolution is increased many times higher than the pitch of the markings, being limited by the accuracy of the marking pitch, width and edge quality, the positional accuracy of photodiodes providing the quadrature signals and the signal to noise ratio of these photodiodes. The disadvantage of these systems are, that in order to provide measurement accuracy in the order of microns, very high quality components, "micron accuracy" mechanical and assembly tolerances, and high quality markings are needed. As an example, in both the above prior art patents, the phase error of the quadrature signals is equal to the positional error of the discrete photodiode detectors, plus the positional error of the markings, plus the errors due to the electrical and optical noise, mismatch of the detectors, and other components in the signal processing system.

The electronic circuit according to the present invention seeks to overcome some of these disadvantages by extensive over-sampling of the incident EMR via an opto-electronic sensor which has one or more arrays of multiple photodiode detectors, each array of photo-diode detectors simultaneously spanning many pitches of the pattern, of incident EMR impinging on the array. In this specification "pitch" of the pattern is defined as the distance between adjacent regions of maximum EMR intensity of the pattern of incident EMR impinging on the array of detectors, and directly relates to the pitch of the markings on the graduated surface or surfaces from which the EMR was reflected (for a reflective encoder) or through which the EMR was transmitted (for a transmissive encoder). As a result the measurement accuracy is higher than the positional accuracy of any single detector in the array, and indeed the positional accuracy of a single pattern pitch. The positional accuracy of the resulting quadrature pair signals is not determined by mechanical and assembly tolerances, but by the positional accuracy of the "very large scale integration" (VLSI) process used for the manufacture of the photodiode arrays and can be as low as 0.1 um economically with today's silicon fabrication processes. According to the present invention, the opto-electronic circuit for the encoder sensor component does not rely on the use of expensive and highly accurate marking processes for the manufacture of the encoder, and is able to tolerate local imperfections in the graduated surface(s) of the encoder, even damaged or entirely missing areas of markings.

It is an aim of this invention to provide a very accurate opto-electronic relative position measurement circuit comprising less accurate (and hence lower cost) elements. A sensor component of an encoder, employing an opto-electronic circuit according to the present invention, will typically have >100 times higher resolution than the pitch of the markings on the graduated surface whose relative position is to be measured, >10 times higher resolution than the pitch of the array of photodiode detectors, and >10 times higher measurement accuracy than the positional accuracy of any of the individual detectors in the array.

Extensive over-sampling of the incident EMR pattern impinging on the array, and massively-parallel collective computation within the opto-electronic circuit, results in the relative position measurement resolution being determined by the pitching accuracy of the detector array, rather than being limited by the pitching accuracy of the encoder marking graduations. In addition, by measuring many pitches of the incident EMR pattern, the accuracy of the relative position measurement is theoretically $\sqrt{n_p}$ times higher than the positional accuracy of any individual pitch of the incident EMR pattern, where $n_p$ is the number of pattern pitches being sampled by the detector array. The advantage of this approach is that it does not require an expensive graduation marking process to achieve "submicron" resolution in relative position measurement of the sensor component. Furthermore, assuming analog (for example photodiode) detectors are used in the array, the measurement technique provides subpixel resolution, and can economically supply 10–100 times higher resolution than that of the detector array pitch. The signal to noise ratio of the relative position measurement is typically more than $\sqrt{n_d}$ times larger than the signal to noise ratio of the individual detectors, where $\sqrt{n_d}$ is the number of detectors in the array. This is a clear advantage because, using today's VLSI silicon fabrication processes, one or more arrays consisting of thousands of detectors can be implemented economically on a single chip.

The computation that is needed for the relative position measurement is mainly an inner-product operation, which is executed very efficiently by a capacitive circuit. The capacitive correlator circuits, according to the present invention, carry out the necessary computation in a massively-parallel single operation, achieving the highest possible processing speed and hence minimum processing time. The computing accuracy is related to the accuracy of the capacitors within the capacitive correlator circuits which is the best controlled parameter of VLSI circuits, providing the most area-efficient solution for the type of circuit architecture. Also the massively-parallel, analog inner-product computation block minimizes the energy needed to perform the computation, requiring as little as 0.1% of the power dissipation of corresponding digital microprocessor solutions.

The electronic circuit, according to the present invention, is suitable for very high resolution relative position measurement over a range corresponding to one pitch of the incident EMR pattern. To obtain high resolution absolute position measurement extending beyond this one-pitch range, the circuit can be used in combination with simple, lower resolution absolute bar code measurement techniques. For example, the graduation markings may be encrypted using a variable width marking (eg. a binary thin/thick marking) to the graduations or, alternatively, a separate bar-code marking graduation on the planar or cylindrical surface in the encoder can be employed. Many different bar-code marking encryption techniques are commonly used in industry and consumer products.

SUMMARY OF INVENTION

The present invention consists in an electronic circuit comprising a longitudinally disposed array of electromagnetic radiation (EMR) detectors, two or more correlator units, and a phase angle computing unit, the circuit enabling measurement of the relative position of a spatially periodic intensity pattern of incident EMR impinging on the array of detectors, characterised in that the pitch of the array of EMR detectors is arranged to be smaller than the pitch of the spatially periodic intensity pattern of incident EMR, each correlator unit comprises an array of capacitors connected to a buffer, each detector has an output dependent on the incident EMR impinging on that detector, the output communicated to respective one or more capacitors in each of the two or more correlator units, the capacitances of the one or more capacitors determine a correlator coefficient for that detector in relation to the respective correlator unit, the magnitude of the correlator coefficients arranged to vary periodically in the longitudinal direction along the length of the array according to a predetermined periodic weighting function, each correlator unit analog-computing the weighted sum of the respective detector outputs according to the respective predetermined periodic weighting function for that correlator unit and outputting an analog representation of this weighted sum at its respective buffer, the weighting functions of the two or more correlator units mutually offset by a predetermined phase angle, the phase angle computing unit connected to the buffers of each correlator unit, and enabling computation of the relative phase angle of the spatially periodic intensity pattern of incident EMR, and hence its relative position expressed as the relative phase angle of the pattern.

It is preferred that each array of capacitors of each correlator unit comprises a first and second capacitor sub-array, each of the capacitor sub-arrays comprise a common plate and a plurality of top plates, the common plate of the first capacitor sub-array is connected to the positive input of the buffer of the correlator unit, the common plate of the second capacitor sub-array is connected to the negative input of the buffer of the correlator unit, and each detector is connected to the top plate of the respective capacitor of the first capacitor sub-array of the correlator unit and to the top plate of the respective capacitor of the second capacitor sub-array of the correlator unit.

It is preferred that the output of each detector is a voltage, the detector voltage output is applied as an input to the respective capacitor of each of the first and second capacitor sub-arrays of each of the two or more correlator units via an array of switches, each switch having at least two states comprising a calibration state wherein the respective capacitor top plates are connected to a reference voltage and the buffer output is set to zero, and a functional state wherein the respective capacitor top plates are connected to the detector output voltage.

It is preferred that the input applied to the capacitor of the first capacitor sub-array is equal to the input applied to the capacitor of the second capacitor array for each correlator unit, the input comprises a voltage transition from a predefined reference voltage to the respective detector output voltage, and the correlator coefficients for each detector in relation to the respective correlator unit is therefore the difference of the capacitances of the respective first and second capacitor sub-array capacitors.

Alternatively, it is preferred that, for each correlator unit, a positive correlator coefficient is generated if the input to a given capacitor of the first capacitor sub-array is a voltage transition from a predefined reference voltage to the respective detector output voltage and the input to the respective capacitor of the second capacitor sub-array is a voltage transition from the respective detector output voltage to the predefined reference voltage, a negative correlator coefficient is generated if the input to a given capacitor of the first capacitor sub-array is a voltage transition from the respective detector output voltage to the predefined reference voltage and the input to the respective capacitor of the second capacitor sub-array is a voltage transition from the predefined reference voltage to the respective detector output voltage, and the absolute value of the correlator coefficient is therefore the sum of the capacitances of the respective first and second capacitor sub-array capacitors.

It is preferred that the electronic circuit comprises two correlator units.

It is preferred that the correlator coefficients vary sinusoidally along the length of the array, having a pitch equal to the pitch of the spatially periodic intensity pattern of the incident EMR, the first correlator unit having a phase angle of zero degrees and calculating the sine weighted sum of the detector outputs, and the second correlator unit having a phase angle of 90 degrees and calculating the cosine weighted sum of the detector outputs.

It is preferred that the capacitor top plates have equal width measured in the longitudinal direction of the array and a varying length measured perpendicular to this direction.

Alternatively, it is preferred that the capacitor top plates have equal length and varying width.

It is preferred that the pitch of the array of detectors and the weighting functions of each of the correlator units are arranged such that each of the weighting functions are zero halfway between different adjacent pairs of detectors of the array.

It is preferred that the pitch of the weighting functions of each of the correlator units are arranged to be equal to the pitch of the spatially periodic intensity pattern of the incident EMR.

It is preferred that the electronic circuit is an integrated circuit.

MODE OF CARRYING OUT THE INVENTION

Figure 1:
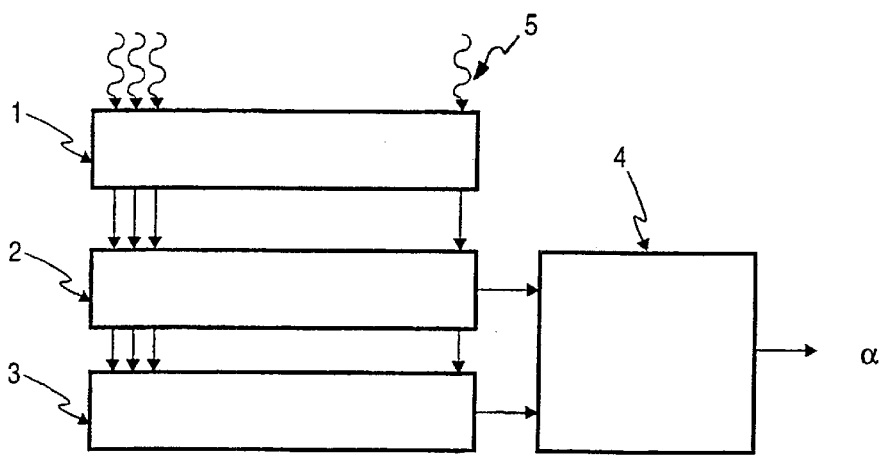
FIG. 1 is block diagram of a preferred embodiment of the electronic circuit according to the present invention.
Figure 2:
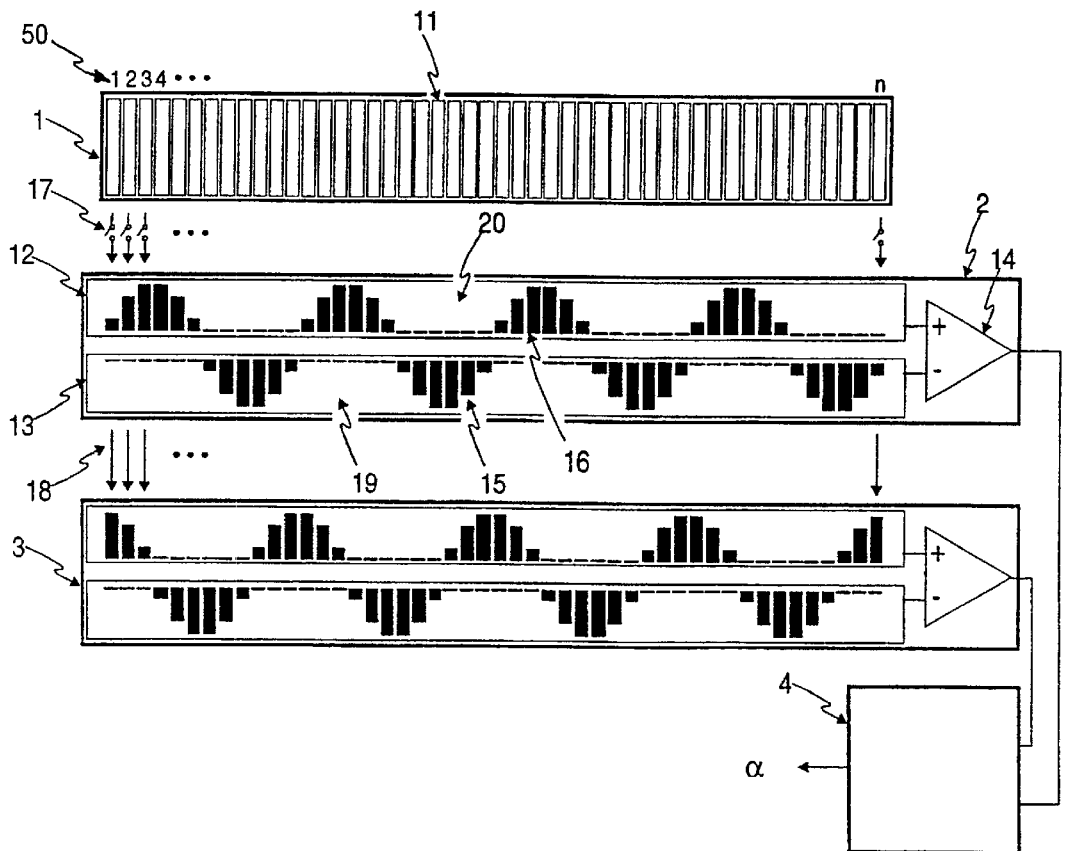
FIG. 2 is a schematic layout of the electronic circuit shown in FIG. 1.

Referring to FIGS. 1 and 2, the electronic circuit is shown in the form of an application specific integrated circuit (ASIC) and comprises array 1 of EMR detectors, sine correlator unit 2, cosine correlator unit 3 and inverse tangent computing unit 4. Array 1 comprises a plurality of identical EMR sensitive photodiode detectors 11, which each have an analog voltage output proportional to the intensity of the incident EMR impinging on the respective detector. An "array index" 50 is shown starting from "1" at the left end of array 1 and increasing to "n" at the right end of array 1.

The same array index convention applies to capacitor sub-array 12 of positive capacitors and to capacitor sub-array 13 of negative capacitors of both sine correlator unit 2 and cosine correlator unit 3. Buffers 14 of each correlator unit buffer the output of the respective capacitor subarrays 12 and 13 with unity voltage gain. Capacitor sub-array 12 of each correlator unit comprises positive common plate 20 and a plurality of positive top plates 16. Capacitor sub-array 13 of each correlator unit comprises negative common plate 19 and a plurality of negative top plates 15. Positive common plate 20 of each correlator unit is connected to the positive input of respective buffer 14 and negative common plate 19 of each correlator unit is connected to the negative input of respective buffer 14. Each detector 11 is connected to respective positive and negative top plates 16 and 15 of sine and cosine correlator units 2 and 3 via array of switches 17 and direct connections 18. Hence the output of each detector 11 can be individually switched to four top plates (ie. two positive top plates 16 and two negative top plates 15) of the same array index via a single switch.

The capacitance of each top plate is proportional to its area. A "periodic weighting function" is obtained by modulating the respective top plate areas as a function of their array index as shown in FIG. 2. For the schematic layout arrangement shown in FIG. 2, a correlator coefficient for each array index position for each correlator unit can be calculated which is numerically equal to the difference of the corresponding positive and negative top plate capacitances. It is preferred that the width of top plates 16 and 15 (measured in the longitudinal direction of array 1) are equal and only their length (measured perpendicular to this direction) is varied as a function of the required correlator coefficient. This differential arrangement ensures that unpredictable fringing capacitances are cancelled and, for sine correlator unit 2 and cosine correlator unit 3, the corresponding correlator coefficient for each detector 11, and hence the overall periodic weighting function for that correlator unit, is accurately controlled by the variation in length dimension of the corresponding positive and negative top plates 16 and 15.

Figure 3A:
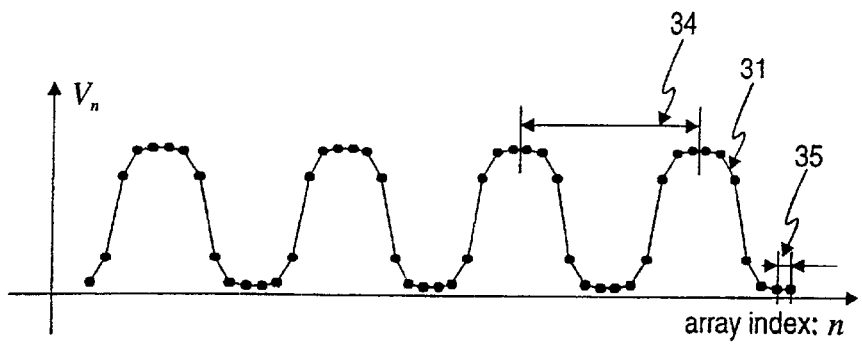
FIG. 3a is a graph of the detector outputs of the electronic circuit shown in FIG. 1.
Figure 3B:
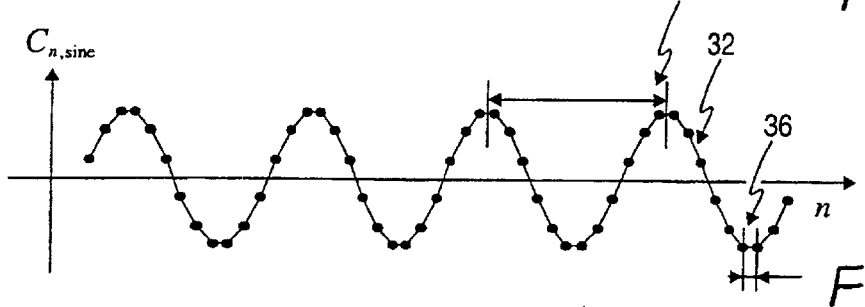
FIG. 3b is a graph of the correlator coefficients of the sine correlator unit of the electronic circuit shown in FIG. 1.
Figure 3C:
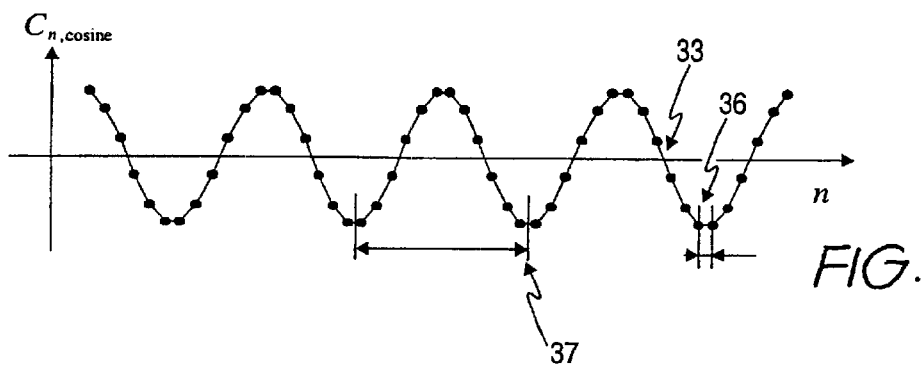
FIG. 3c is a graph of the correlator coefficients of cosine correlator unit of the electronic circuit shown in FIG. 1.
Figure 4:
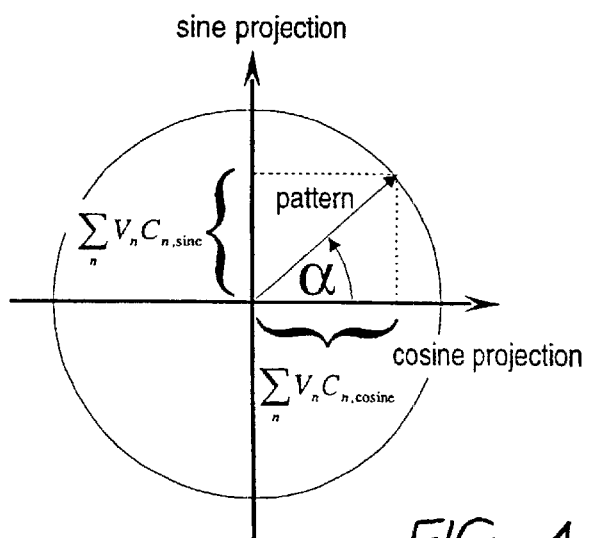
FIG. 4 is a graphic representation of the calculation of relative position (or relative phase α) of the sine and cosine correlator units of the electronic circuit shown in FIG. 1.

The principle of operation of the electronic circuit is now more fully explained in reference to FIGS. 3a–3c and 4. Referring to FIG. 3a, the output voltage of detectors 11, expressed as a function of array index, is image 31 of the spatially periodic intensity pattern of the incident EMR impinging on array 1. The relative phase angle α of this pattern is to be calculated as a measure of its relative position. Pitch 35 of array 1 is arranged to be many times smaller than that of pitch 34 of image 31, the latter corresponding to the pitch of the pattern of the incident EMR impinging on array 1. Referring now to FIGS. 3a, 3b and 3c image 31 of the incident EMR pattern is correlated with periodic weighting functions 32 and 33, each with a pitch 37 which is arranged to be equal to that of the pitch 34 of image 31 (and hence the pitch of the spatially periodic intensity pattern of the incident EMR on array 1), but having different phases. In this preferred embodiment of the present invention, periodic weighting functions 32 and 33 are mutually offset by 90 degrees, therefore correlation of image 31 with these periodic weighting functions effectively generates orthogonal projections of image 31, which are plotted in FIG. 4. The sine projection by an ideal sine correlator unit is the inner product of detector outputs and respective correlator coefficients and is given by:

$$V_{out,sine} = \sum_n V_n C_{n,sine} \quad [1]$$

where $V_{out,sine}$ the output of the sine correlator unit, $V_n$ is the n-th detector output, and $C_{n,sine}$ is the n-th correlator coefficient of the sine correlator unit.

Similarly the cosine projection is given by:

$$V_{out,cosine} = \sum_n V_1 C_{n,cosine} \quad [2]$$

where $V_{out,cosine}$ is the output of the cosine correlator unit, $V_n$ is the n-th detector output, and $C_{n,cosine}$ is the n-th correlator coefficient of the cosine correlator unit.

The pattern phase angle is obtained by calculating the inverse tangent of the ratio of sine projection and cosine projection:

$$\alpha = \arctan\left(\frac{\sum_n V_n C_{n,sine}}{\sum_n V_n C_{n,cosine}}\right) \quad [3]$$

Figure 5:
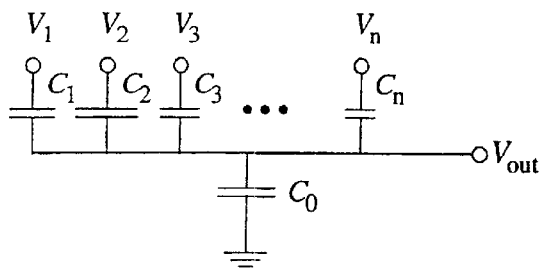
FIG. 5 is a schematic circuit diagram of a capacitive correlator unit of the type used in the electronic shown in FIG. 1.

A simple capacitive correlator unit circuit is shown in FIG. 5 and it performs the following computation:

$$V_{out} = \frac{\sum_n V_n C_n}{\sum_n C_n + C_0} = \frac{1}{C_{all}} \sum_n V_n C_n \quad [4]$$

where $V_{out}$ is the output voltage of the respective capacitor sub-array to either the positive or negative input of buffer 14, $V_n$ is the n-th detector output, $C_n$ is the capacitance of the n-th capacitor of the respective capacitor sub-array, $C_0$ is the parasitic capacitance at the summing node, and $C_{all}$ is the sum of all capacitances for the capacitor sub-array.

Compared to the ideal case of Equation 1, here we find a proportional term $1/C_{all}$. The computed phase angle α is correct only if this proportional term is equal for the two correlator units. If this is the case, this term is cancelled when computing the ratio of sine projection and cosine projection, and we get the same result as in Equation 3:

$$\alpha = \arctan\left(\frac{C_{all}\sum_n V_n C_{n,sine}}{C_{all}\sum_n V_n C_{n,cosine}}\right) = \arctan\left(\frac{\sum_n V_n C_{n,sine}}{\sum_n V_n C_{n,cosine}}\right) \quad [5]$$

Figure 6A:
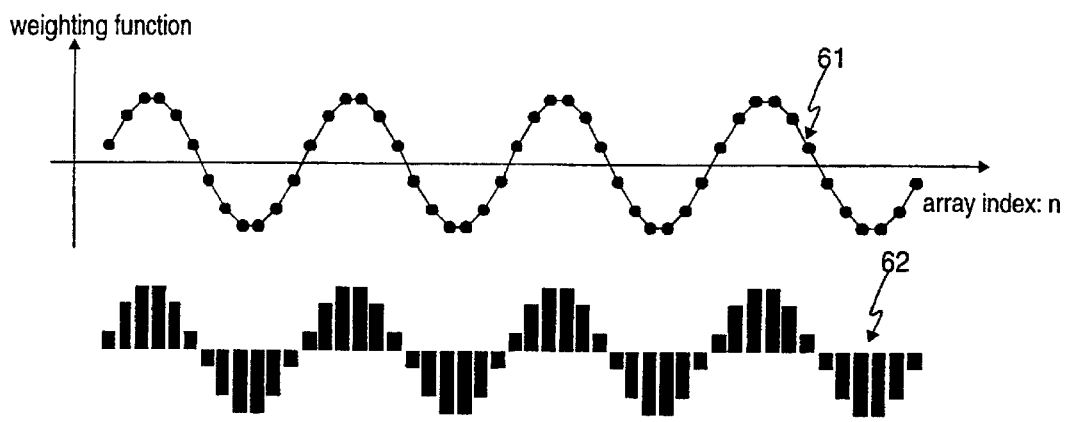
FIG. 6 is a graphical representation of two sampling strategies for weighting functions.

Referring now to FIG. 6a, it is preferred that the correlator coefficients are obtained by sampling the sine (or cosine) weighting function 61 in such a way that the zero crossing of the sine weighting function is exactly halfway between two samples. This way neither zero weights, nor weights equal to the maximum of the weighting function are obtained via use of capacitor top plate geometry 62. This reduces the required dynamic range for capacitor size, avoids zero weighting of samples, simplifies the layout, improves the ratio of useful capacitance and overall capacitance, therefore increases signal to noise ratio of the correlator units.

Figure 6B:
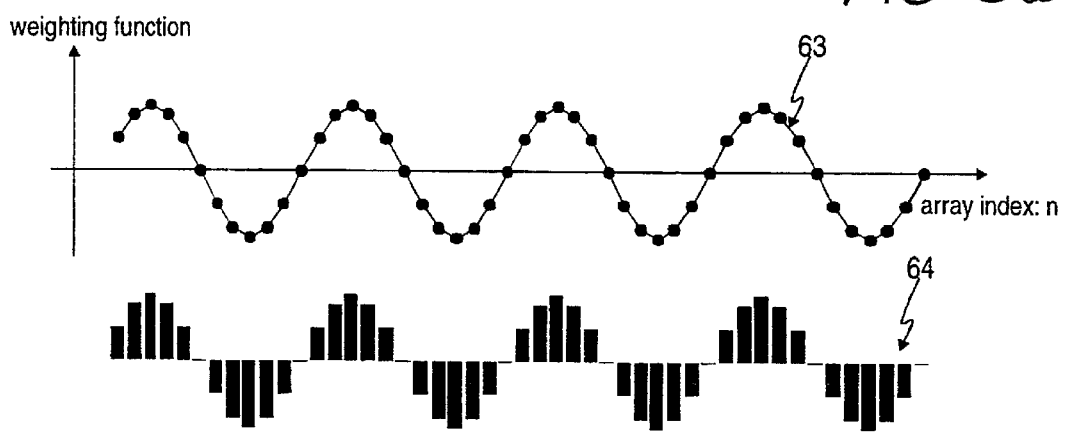

By way of explanation, FIG. 6b shows the less preferred case where sine (or cosine) weighting function 63 is sampled such that both zero weights, and weights equal to the maximum of the weighting function are obtained via use of capacitor top plate geometry 64.

Figure 7:
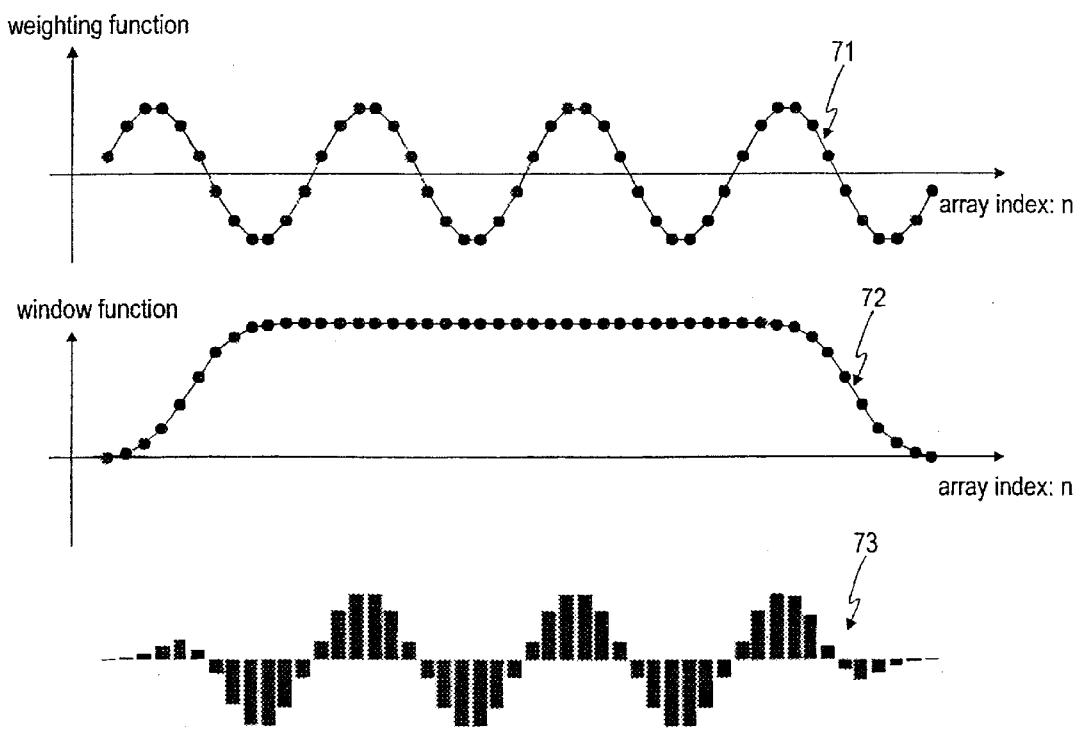
FIG. 7 is a graphical representation of the sampling strategy for an improved weighting function using windowing.

FIG. 7 shows an alternative weighting function, where the original sine (or cosine) weighting function 71 is multiplied by a window function 72. The resulting net weighting function 73 has decreasing elements toward the borders. This is a well known method in signal processing to decrease unfavourable border effects. Such border effects exist, for example, when the markings (and hence pattern) are not perfectly regular or if the markings (and hence pattern) are modulated in some manner—for example when the variable thickness graduation markings (eg. thick/thin bar-code) arrangement is used as previously described. In this case, the windowing technique has been shown to reduce the phase angle measurement error.

Figure 8:
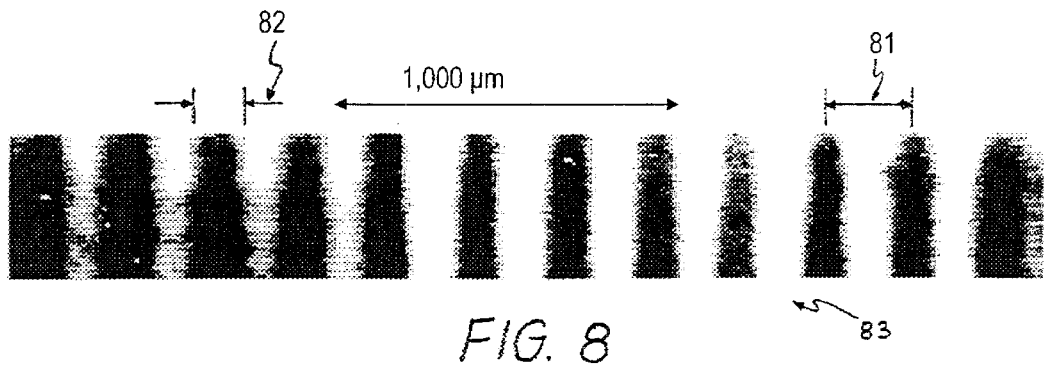
FIG. 8 is an example of an image where "submicron" measurement resolution (typically 0.01 um) and accuracy (typically 0.1 um) is achieved according to the present invention despite a relatively poor pattern quality of the incident EMR impinging on the array of detectors, and a low positional accuracy (10 um) of the edges of individual markings on the graduated surface of the respective reflective encoder.

FIG. 8 shows an example of an image 83 of a spatially periodic intensity pattern of incident EMR impinging on an array of detectors according to the present invention. This image provided approximately 0.01 um resolution and 0.1 um measurement accuracy, despite the relatively poor image quality and the large (approximately 10 um) positional uncertainties of the individual pattern sections, such as pitch 81 and width 82 of the regions of high intensity of the incident EMR.

The quadrature interpolation technique described in reference to this embodiment operates with two 90 degree offset weighting functions: a sine weighting function and a cosine weighting function. However, the technique can be extended to more than two weighting functions, which may have several advantages. Firstly, the measurement accuracy is increased statistically by the redundancy introduced by the use of more than two weighting functions. Secondly, the measurement accuracy of the sine/cosine technique is smaller at 0, 90, 180, 270 degrees because close to these phase angles one correlator unit gives a very small output. Using three or more phase offset weighting functions, we can guarantee that there are always at least two correlator units with a non-zero output.

It should be obvious to those skilled in the art that numerous variations and modifications could be made to the electronic circuit without departing from the spirit and scope of the present invention.

What is claimed is:

1. An electronic circuit comprising a longitudinally disposed array of electromagnetic radiation (EMR) detectors, two or more correlator units, and a phase angle computing unit, the circuit enabling measurement of the relative position of a spatially periodic intensity pattern of incident EMR impinging on the array of detectors, characterised in that the pitch of the array of EMR detectors is arranged to be smaller than the pitch of the spatially periodic intensity pattern of incident EMR, each correlator unit comprises an array of capacitors connected to a buffer, each detector has an output dependent on the incident EMR impinging on that detector, the output communicated to respective one or more capacitors in each of the two or more correlator units, the capacitances of the one or more capacitors determine a correlator coefficient for that detector in relation to the respective correlator unit, the magnitude of the correlator coefficients arranged to vary periodically in the longitudinal direction along the length of the array according to a predetermined periodic weighting function, each correlator unit analog-computing the weighted sum of the respective detector outputs according to the respective predetermined periodic weighting function for that correlator unit and outputting an analog representation of this weighted sum at its respective buffer, the weighting functions of the two or more correlator units mutually offset by a predetermined phase angle, the phase angle computing unit connected to the buffers of each correlator unit, and enabling computation of the relative phase angle of the spatially periodic intensity pattern of incident EMR, and hence its relative position expressed as the relative phase angle of the pattern.

2. An electronic circuit as claimed in claim 1, wherein each array of capacitors of each correlator unit comprises a first and second capacitor sub-array, each of the capacitor sub-arrays comprise a common plate and a plurality of top plates, the common plate of the first capacitor sub-array is connected to the positive input of the buffer of the correlator unit, the common plate of the second capacitor sub-array is connected to the negative input of the buffer of the correlator unit, and each detector is connected to the top plate of the respective capacitor of the first capacitor sub-array of the correlator unit and to the top plate of the respective capacitor of the second capacitor sub-array of the correlator unit.

3. An electronic circuit as claimed in claim 2, wherein the output of each detector is a voltage, the detector voltage output is applied as an input to the respective capacitor of each of the first and second capacitor sub-arrays of each of the two or more correlator units via an array of switches, each switch having at least two states comprising a calibration state wherein the respective capacitor top plates are connected to a reference voltage and the buffer output is set to zero, and a functional state wherein the respective capacitor top plates are connected to the detector output voltage.

4. An electronic circuit as claimed in claim 3, wherein the input applied to the capacitor of the first capacitor sub-array is equal to the input applied to the capacitor of the second capacitor array for each correlator unit, the input comprises a voltage transition from a predefined reference voltage to the respective detector output voltage, and the correlator coefficients for each detector in relation to the respective correlator unit is therefore the difference of the capacitances of the respective first and second capacitor sub-array capacitors.

5. An electronic circuit as claimed in claim 3, wherein for each correlator unit, a positive correlator coefficient is generated if the input to a given capacitor of the first capacitor sub-array is a voltage transition from a predefined reference voltage to the respective detector output voltage and the input to the respective capacitor of the second capacitor sub-array is a voltage transition from the respective detector output voltage to the predefined reference voltage, a negative correlator coefficient is generated if the input to a given capacitor of the first capacitor sub-array is a voltage transition from the respective detector output voltage to the predefined reference voltage and the input to the respective capacitor of the second capacitor sub-array is a voltage transition from the predefined reference voltage to the respective detector output voltage, and the absolute value of the correlator coefficient is therefore the sum of the capacitances of the respective first and second capacitor sub-array capacitors.

6. An electronic circuit as claimed in claim 1, wherein the electronic circuit comprises two correlator units.

7. An electronic circuit as claimed in claim 6, wherein the correlator coefficients vary sinusoidally along the length of the array, having a pitch equal to the pitch of the spatially periodic intensity pattern of the incident EMR, the first correlator unit having a phase angle of zero degrees and calculating the sine weighted sum of the detector outputs, and the second correlator unit having a phase angle of 90 degrees and calculating the cosine weighted sum of the detector outputs.

8. An electronic circuit as claimed in claim 2, wherein the capacitor top plates have equal width measured in the longitudinal direction of the array and a varying length measured perpendicular to this direction.

9. An electronic circuit as claimed in claim 2, wherein the capacitor top plates have equal length and varying width.

10. An electronic circuit as claimed in claim 1, wherein the pitch of the array of detectors and the weighting functions of each of the correlator units are arranged such that each of the weighting functions are zero halfway between different adjacent pairs of detectors of the array.

11. An electronic circuit as claimed in claim 1, wherein the pitch of the weighting functions of each of the correlator units are arranged to be equal to the pitch of the spatially periodic intensity pattern of the incident EMR.

12. An electronic circuit as claimed in claim 1, wherein the electronic circuit is an integrated circuit.

* * * * *